(12) United States Patent
Amoriello

(10) Patent No.: US 11,091,927 B2
(45) Date of Patent: Aug. 17, 2021

(54) SUPPORT DEVICE FOR SUPPORTING AT LEAST ONE PERSON LOCATED ON IT

(71) Applicant: Roberto Amoriello, Bolzano (IT)

(72) Inventor: Roberto Amoriello, Bolzano (IT)

( * ) Notice: Subject to any disclaimer, the term of this patent is extended or adjusted under 35 U.S.C. 154(b) by 404 days.

(21) Appl. No.: 16/094,047

(22) PCT Filed: Apr. 19, 2017

(86) PCT No.: PCT/IT2017/000077
§ 371 (c)(1),
(2) Date: Oct. 16, 2018

(87) PCT Pub. No.: WO2017/183053
PCT Pub. Date: Oct. 26, 2017

(65) Prior Publication Data
US 2019/0128008 A1     May 2, 2019

(30) Foreign Application Priority Data
Apr. 22, 2016   (IT) .......................... 102016000041751

(51) Int. Cl.
*E04H 15/06* (2006.01)
*A47C 1/14* (2006.01)
(Continued)

(52) U.S. Cl.
CPC ............. *E04H 15/06* (2013.01); *A47C 1/146* (2013.01); *A47C 4/42* (2013.01); *A47C 7/002* (2013.01);
(Continued)

(58) Field of Classification Search
CPC ... E04H 15/06; A47C 1/146; A47C 4/42; A47C 7/002; A47C 7/66; A47C 19/124; B60N 2/3095; B60N 3/008
See application file for complete search history.

(56) References Cited

U.S. PATENT DOCUMENTS

| 4,830,036 A * | 5/1989 | Sanders .................. E04H 15/06 135/132 |
| 5,205,089 A * | 4/1993 | Cunningham .......... E04H 15/06 135/132 |
| 6,257,259 B1 * | 7/2001 | Ardouin ................... B60J 11/08 135/88.07 |

FOREIGN PATENT DOCUMENTS

| CN | 203244152 U | 10/2013 |
| CN | 204754424 U | 11/2015 |

(Continued)

*Primary Examiner* — David R Hare
*Assistant Examiner* — Adam C Ortiz
(74) *Attorney, Agent, or Firm* — Smartpat PLC

(57) ABSTRACT

A support device for supporting at least one person located on it includes a stiff frame, which comprises a plurality of structural elements and a plurality of supporting elements. Securing means are provided for securing the stiff frame to roof bars of a motor vehicle. A plurality of rotatable arms is provided, each of which is hinged in a specific supporting element and is rotatable from a rest position into an operating position, and vice versa. Locking means are provided for locking the rotatable arms in an operating position. A cloth, on which said at least one person can be supported has connecting means by which it is connectable to the rotatable arms. The direction of longitudinal extension of each supporting element is not parallel to the longitudinal axis of the stiff frame and each rotatable arm is made of two portions inclined with respect to each other.

12 Claims, 5 Drawing Sheets

(51) Int. Cl.
*A47C 7/66* (2006.01)
*B60N 2/30* (2006.01)
*A47C 4/42* (2006.01)
*A47C 7/00* (2006.01)
*B60R 9/04* (2006.01)
*A47C 17/80* (2006.01)
*A47C 19/12* (2006.01)
*B60N 3/00* (2006.01)

(52) U.S. Cl.
CPC ............... *A47C 7/66* (2013.01); *A47C 17/80* (2013.01); *A47C 19/124* (2013.01); *B60N 2/3095* (2013.01); *B60N 3/008* (2013.01); *B60R 9/04* (2013.01)

(56) References Cited

FOREIGN PATENT DOCUMENTS

| | | | |
|---|---|---|---|
| GB | 1091667 | A | 11/1967 |
| JP | H07279486 | A | 10/1995 |

\* cited by examiner

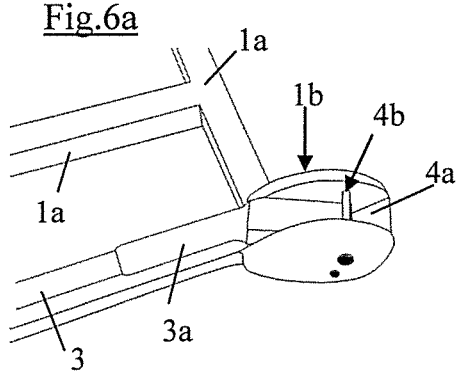
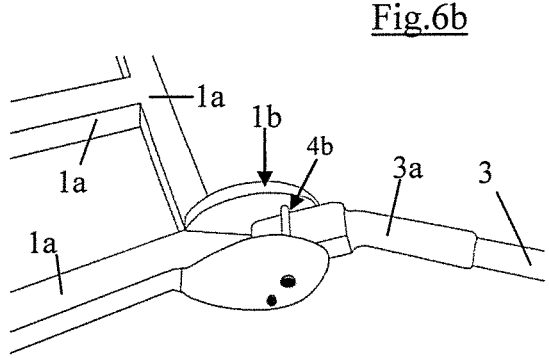
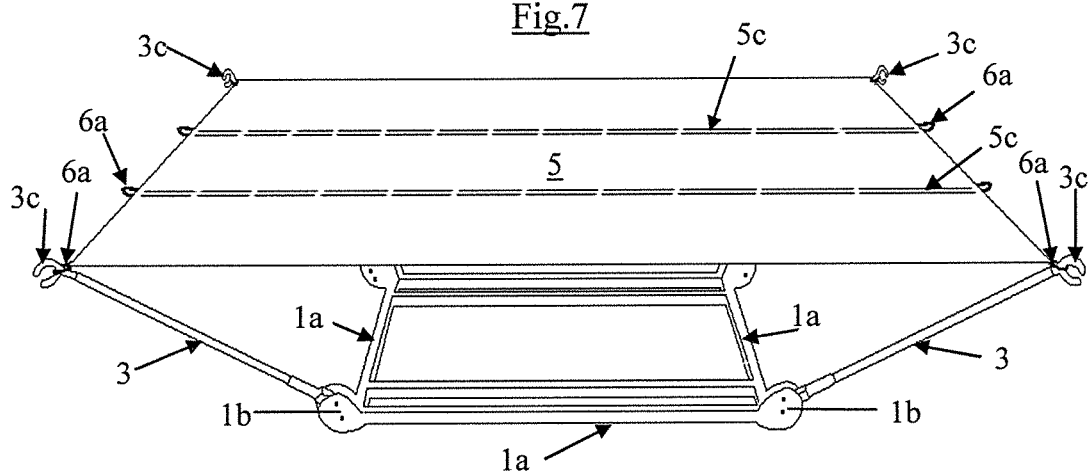
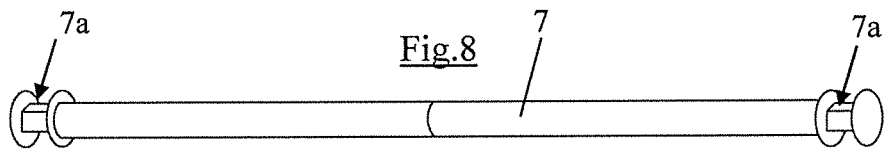
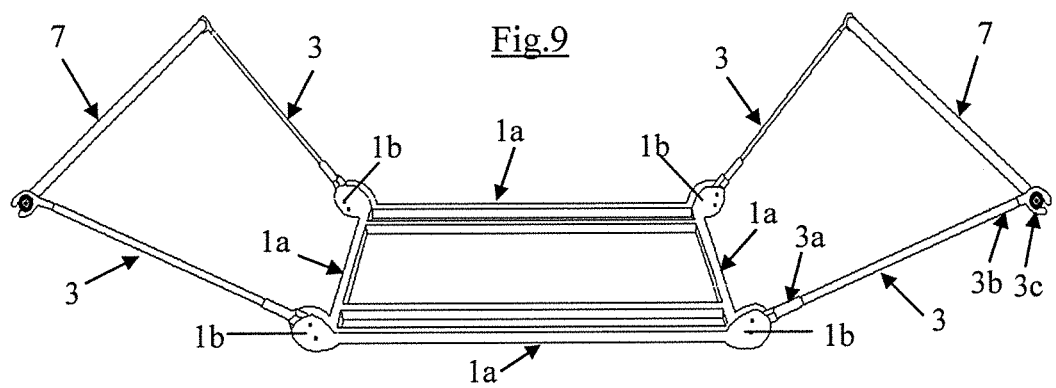

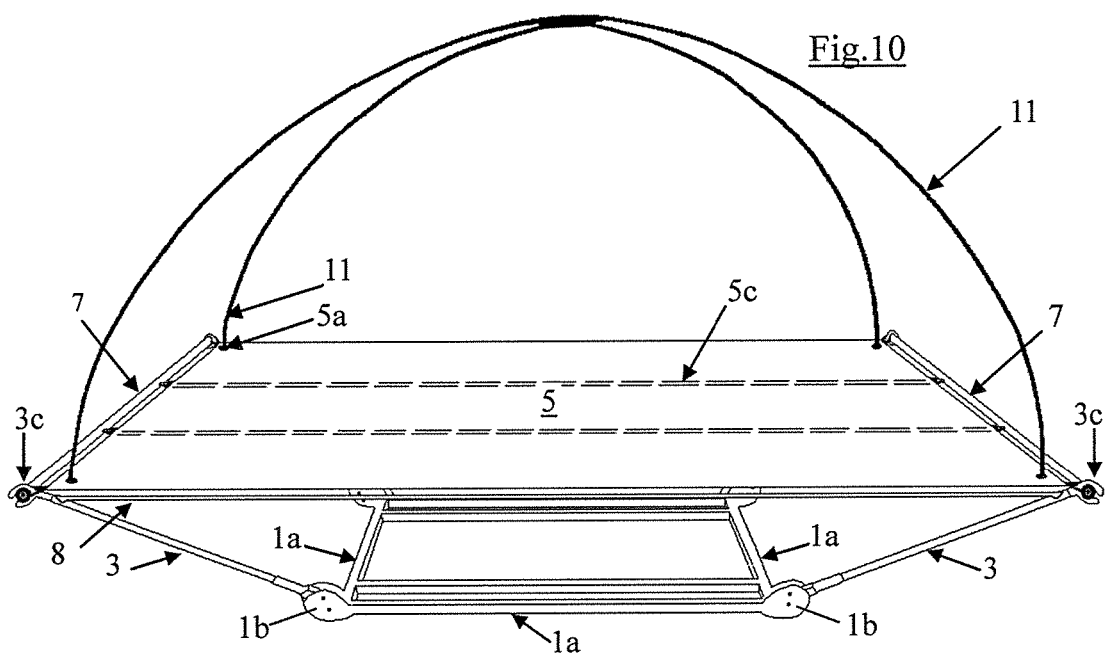
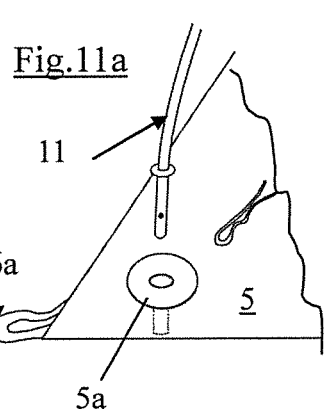
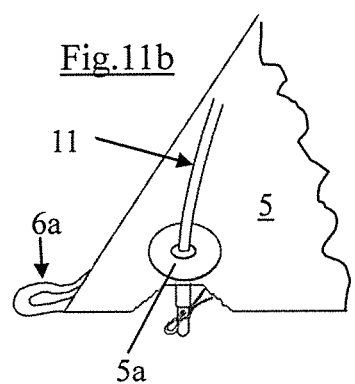
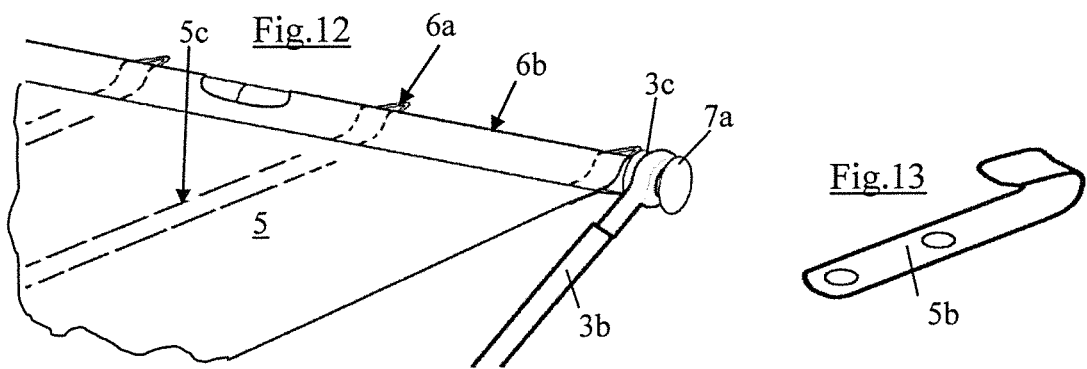
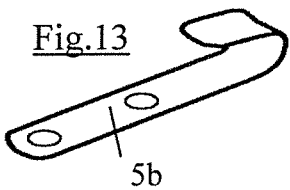

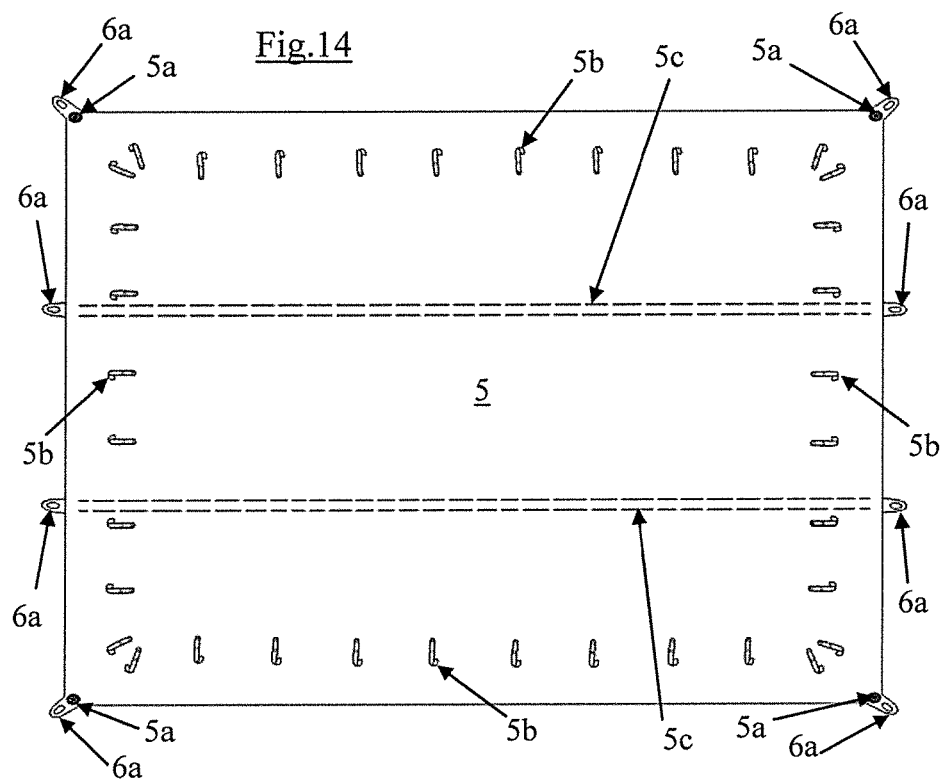
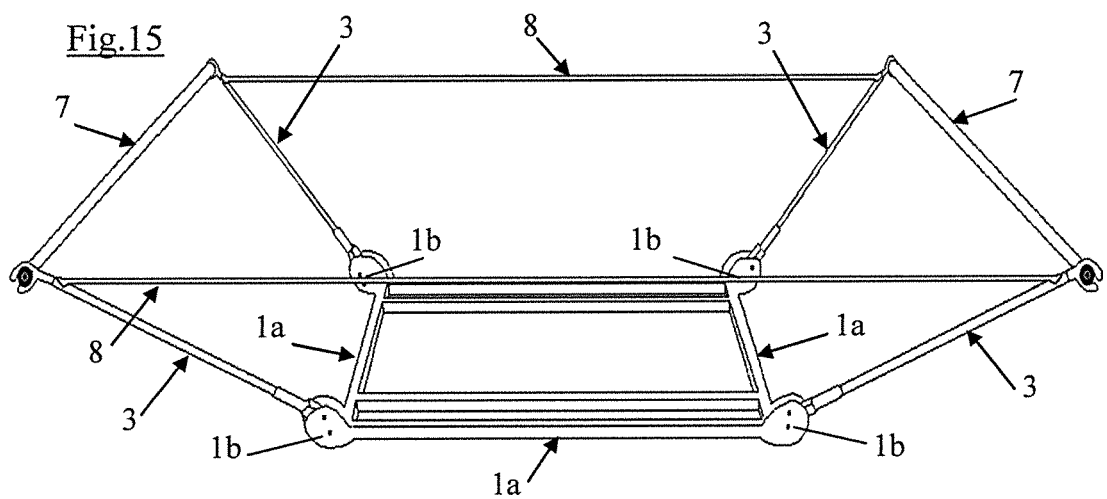
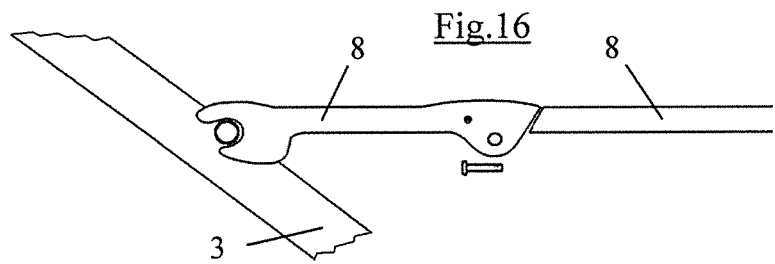

SUPPORT DEVICE FOR SUPPORTING AT LEAST ONE PERSON LOCATED ON IT

TECHNICAL FIELD

The disclosure relates to a support device for supporting at least one person located on it.

BACKGROUND

In the sector of travels for leisure purposes various examples of support devices for supporting at least one person located on them are known. The purpose of these support devices is to allow people to be able to sit or lie in a safe and sufficiently comfortable way on them both for resting, for example for sleeping or relaxing, and for entertaining themselves, for example reading, talking or sunbathing. Therefore, they allow to stop over, with overnight stay as well, both in equipped places and in non-equipped places for accommodating visitors.

These known support devices are used in particular in combination with a vehicle, so that it is possible to benefit from them in any place where the vehicle stops, and among all the known support devices particularly interesting for the present invention are those that are placed on top of the roof of the vehicle and are fixed to the roof bars or to the luggage rack of the vehicle. These known support devices are mainly of two types.

A first type thereof provides some rigid bodies for the people, for example some platforms, plates and the like, which act as rigid resting bases, which can support people. These are extremely specialized and complex support devices, which are also laborious to be mounted on or dismounted from the vehicle, also because some of their components, e.g. the plates or the platforms, make them heavy and bulky.

A second type of known support devices, to which the support device according to the invention belongs, is lighter and simpler in its constituent elements with respect to the first type and provides a well-stretched cloth for the people. A person can be safely supported by this cloth because the cloth in its turn is supported by rotatable arms that are hinged in a stiff frame and are kept in position by suitable locking means.

CN 203244152 U and GB 1091667 disclose support devices.

In both the above-mentioned known support devices the rotatable arms, in order to reach their operating position, rotate around axes of rotation that are arranged transversely to the longitudinal axis of the stiff frame, i.e. transversely to the direction of travel of the motor vehicle. As a consequence, the rotation of the rotatable arms from the rest position into the operating position involves an extension of the length of the support device with respect to the length it has in the rest position, but does not involve any increase in the width of the support device, wherein said width remains unchanged and coincides with that of the stiff frame by which the support device is fixed to the motor vehicle. The impossibility for these known support devices to be made wider by means of the rotation movement of their rotatable arms means that the cloth that these support devices provide for people can be as wide as the stiff frame. Therefore, in order to achieve good comfort, some rather wide stiff frames are required, which is a disadvantage because the wider the stiff frame is, the larger are the overall dimensions of the support device in the rest position and the greater is the weight of the support device. Furthermore, there exists an additional limit due to the fact that, when the motor vehicle is moving, the support device, in particular the stiff frame thereof, cannot protrude laterally from the motor vehicle for safety reasons, so if the motor vehicle is small-sized and is not very wide, the cloth, too, will necessarily be not very wide.

SUMMARY

Starting from the context that has been represented, the aim of the present disclosure is to improve in such a way a support device of the type indicated at the beginning, that it provides for the at least one person a cloth, the width of which is greater than that of the stiff frame of the support device.

Said aim is achieved in form of a support device for supporting at least one person thereon which has a stiff frame. The stiff frame comprises a plurality of structural elements and a plurality of supporting elements. Other components of the support device are supported in the plurality of supporting elements and each supporting element is rigidly connected to at least one structural element. Securing means secure the stiff frame to roof bars of a motor vehicle in an selectively unlockable way and such that a longitudinal axis of the stiff frame is parallel to a direction of travel of the motor vehicle. A plurality of rotatable arms, each of which is hinged at one of its ends in a specific supporting element of the stiff frame and is rotatable from a rest position, in which its opposite free end is close to the stiff frame, into an operating position, in which its free end is far from the stiff frame, and vice versa. Locking means lock the rotatable arms in an operating position. A cloth, on which the at least one person can be supported, has connecting means by which it is connectable to the free ends of the rotatable arms. A direction of longitudinal extension of each supporting element is not parallel to the longitudinal axis of the stiff frame and each rotatable arm is made of two portions inclined with respect to each other.

Thanks to the distinctive characteristics provided by the invention, the rotatable arms rotate around axes of rotation that, unlike those of the known support devices, are not arranged transversely to the longitudinal axis of the stiff frame, i.e. transversely to the direction of travel of the motor vehicle. As a consequence, upon rotation of the rotatable arms, their free ends also make a lateral shift, that is to say, their overall shift has a shift component that is transverse to the longitudinal axis of the stiff frame. When the rotatable arms have reached their operating position, the projections of their free ends on the plane identified by the set of the structural elements of the stiff frame lie on the sides of said set of structural elements, that is to say, on the sides of the stiff frame. Thanks to this aspect the cloth, which is connected to said free ends, can thus have a width that is greater than that of the underlying stiff frame.

The securing means may consist of a plurality of U-shaped elements and of a plurality of small plates, each U-shaped element enclosing a roof bar of the motor vehicle and a structural element of the stiff frame and being closed on its open side by a small plate screwed to the U-shaped element. This provides a simple, reliable and preferred embodiment of the securing means by which the stiff frame is fixed to the roof bars of a motor vehicle.

The locking means for each rotatable arm may consist of a resting surface, which is arranged within a groove provided in the respective supporting element, and of a pin, which is insertable into and extractable from the groove transversely with respect to the longitudinal direction of the groove. In the operating position the rotatable arm may rest on the resting surface and be fitted between the resting surface and the pin. This provides a simple, reliable and preferred embodiment of the locking means that keep the rotatable arms in the operating position.

Each rotatable arm may have at its free end a mouth. The connecting means of the cloth may consist of a plurality of rings, and a ring may be hooked in each mouth of the rotatable arms. This allows to connect in simple and reliable way the cloth to the free ends of the rotatable arms.

Reinforcing crosspieces may be provided with two ends of each reinforcing crosspiece being insertable into the respective mouths of two rotatable arms to connect the two rotatable arms to each other. Additionally, longitudinal reinforcing rods may be provided, wherein the two ends of each longitudinal reinforcing rod are intended to be connected to two respective rotatable arms to connect said two rotatable arms to each other. This strengthens the support device, in the case in which some particularly stout people are supported by the cloth.

The cloth may have end turn-ups, in each of which a reinforcing crosspiece is insertable before the ends thereof are inserted in their turn into the respective mouths of the rotatable arms. This allows to obtain a cloth that is stretched in a more uniform way.

A plurality of stabilization bars may be used, each of which is adjustable in length and is hinged to a structural element of the stiff frame, in such a way as to be rotatable from an inactive position, in which the stabilization bar extends parallel to the associated structural element of the stiff frame, into an active position, in which the free end of the stabilization bar extends away from the stiff frame, and vice versa. This increases the stability of the support device when it is not fixed to the roof bars of the motor vehicle but has been placed on the ground. The support device, in fact, is self-sufficient, meaning that it can be used by laying the stiff frame directly onto the ground, after unlocking the securing means that fix the stiff frame to the motor vehicle and taking it off the roof. Therefore, it is possible to use the support device positioning it for example on a field or on a beach near the motor vehicle. In other words, the support device is carried on the roof of the motor vehicle during road travels and then, when stopping over, it can be left on the roof, for example to immediately have at one's disposal a well-stretched cloth, or it can be removed from the roof and placed on the ground near the motor vehicle.

A plurality of supporting stakes may be used, each of which is adjustable in length and is fixable to an associated rotatable arm to take an active position in which the free end of the supporting stake extends away from the rotatable arm. This increases the stability of the support device when it is not fixed to the roof bars of the motor vehicle but it has been placed on the ground.

The structural elements of the stiff frame may form a flat resting plane having a rectangular plan. In this case, the support device may include four rotatable arms and four supporting elements. The supporting elements may be located in correspondence of the vertices of the resting plane and the cloth may be rectangular. Thereby, the stiff frame can also act as a luggage rack, because in a rest condition the flat resting plane having a rectangular plan can be used to load luggage.

The cloth may have anchoring seats for anchoring a load-bearing structure for a covering cloth therein, and hooking means to which the covering cloth or a camping tent can be hooked. Thereby, then the well-stretched cloth can become the floor of a tent-like device, whose covering cloth can alternatively be a mosquito net cloth or a rain/sun protective cloth, or can also act as a pitch on which a camping tent is placed and fixed.

The cloth may have a plurality of reinforcing strips, which extend parallel to and spaced from each other along the longitudinal dimension of the cloth, with each reinforcing strip extending between two rings. Thereby, one obtains both a general reinforcing action of the resistance of the cloth and, having made a subdivision of the surface into strips, each of which can be dedicated to one person, a local side support on both sides around the person lying on the respective strip.

BRIEF DESCRIPTION OF THE DRAWINGS

Further advantages and characteristics of the disclosure will appear from the following description of an embodiment of the support device for supporting a person located on it, which is illustrated by way of example, but not limitation, on the basis of the drawings enclosed.

In FIGS. 1 and 2 the rotatable arms are in the rest position and in FIG. 2 the stiff frame is fixed to the roof bars of a motor vehicle.

in FIG. 4 a rotatable arm is in an intermediate position and the other rotatable arms are in the rest position, while in FIG. 5 all the rotatable arms are in the operating position.

FIGS. 6a and 6b show in an enlarged axonometric view a supporting element of the stiff frame before and after the rotation of the respective rotatable arm, respectively.

FIG. 7 is an axonometric view similar to FIG. 5, but with the addition of a first embodiment of the cloth.

FIGS. 8 and 9 are respectively an axonometric view of a reinforcing cross-piece alone and an axonometric view similar to FIG. 5, but with the addition of two reinforcing crosspieces.

FIG. 10 is an axonometric view similar to FIG. 7, but with the addition of a loadbearing device, which is supported on the cloth and can be the load-bearing device for a covering cloth or the load-bearing device of a camping tent.

FIGS. 11a and 11b show in an enlarged axonometric view the zone of the anchoring seats present on the cloth, in which the load-bearing device of FIG. 10 is supported.

FIG. 12 shows in an axonometric view the zone of connection between a reinforcing crosspiece and a second embodiment of the cloth, which is provided with an end turn-up.

FIGS. 13 and 14 are respectively an axonometric view of one of the hooks of the plurality of hooks with which, on their bottom side, both embodiments of the cloth are provided and a bottom view of the bottom side common to both embodiments of the cloth.

FIGS. 15 and 16 are respectively an axonometric view similar to FIG. 9 but with the addition of two longitudinal reinforcing rods and an enlarged axonometric view of the zone of connection between rotatable arm and longitudinal reinforcing rod.

DETAILED DESCRIPTION

The figures show a support device for supporting at least one person located on it. It comprises a stiff frame, securing means 2a,2b, a plurality of rotatable arms 3, locking means 4a,4b and a cloth 5.

Figure 1:
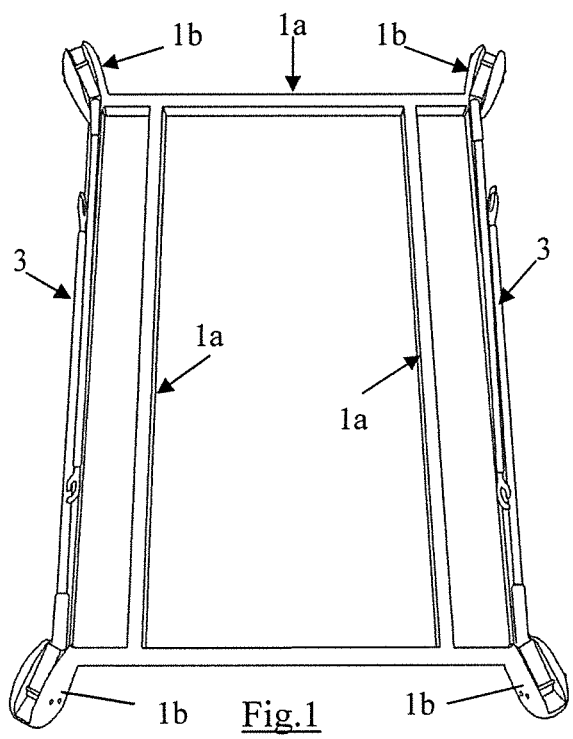
FIGS. 1 and 2 show in a top view the stiff frame and the rotatable arms of the support device.
Figure 2:
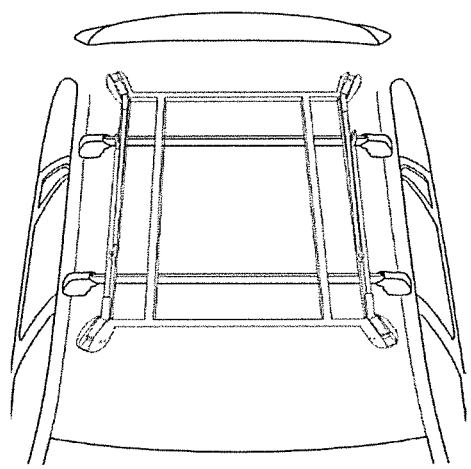
Figure 3:
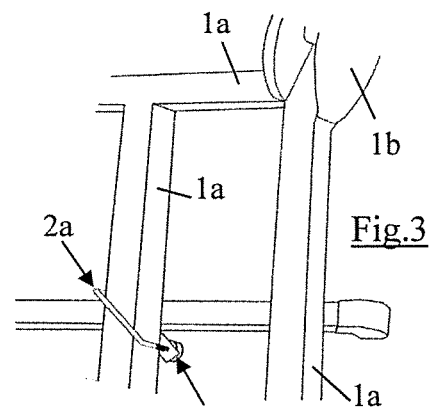
FIG. 3 shows in an enlarged axonometric view the zone in which the securing means operate.
Figure 4:
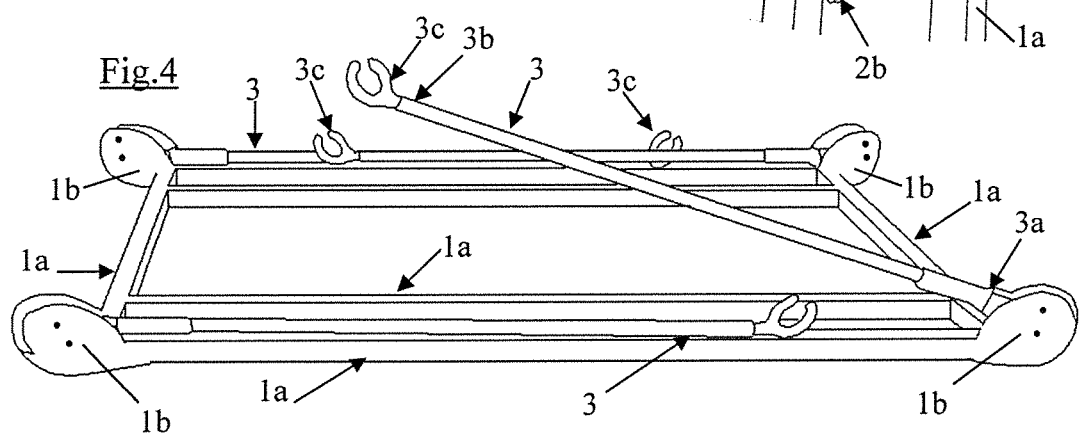
FIGS. 4 and 5 shown again in an axonometric view the stiff frame and the rotatable arms.

As shown for example in FIG. 1, the stiff frame comprises a plurality of structural elements 1a and a plurality of supporting elements 1b. In the supporting elements 1b other components of the support device are supported, in particular the adjustable arms 3, and each supporting element 1b is rigidly connected to at least one structural element 1a. As can be seen in FIG. 2, the stiff frame is also fixable, in an unlockable way when required and by means of the securing means 2a,2b, to the roof bars of a motor vehicle. The stiff frame is fixed to the motor vehicle in such a way that its longitudinal axis is parallel to the direction of travel of the motor vehicle, it would be even better if the longitudinal axis of the stiff frame coincided with the direction of travel. The securing means 2a,2b are known and analogous to those for securing the stiff frames of luggage racks or ski racks to the roof bars. As can be seen for example in FIG. 3, they can consist of a plurality of U-shaped elements 2a and of a plurality of small plates 2b. Each U-shaped element 2a encloses a roof bar of the motor vehicle and a structural element 1a of the stiff frame and is closed on its open side by a small plate 2b screwed to the U-shaped element 2a.

Figure 5:
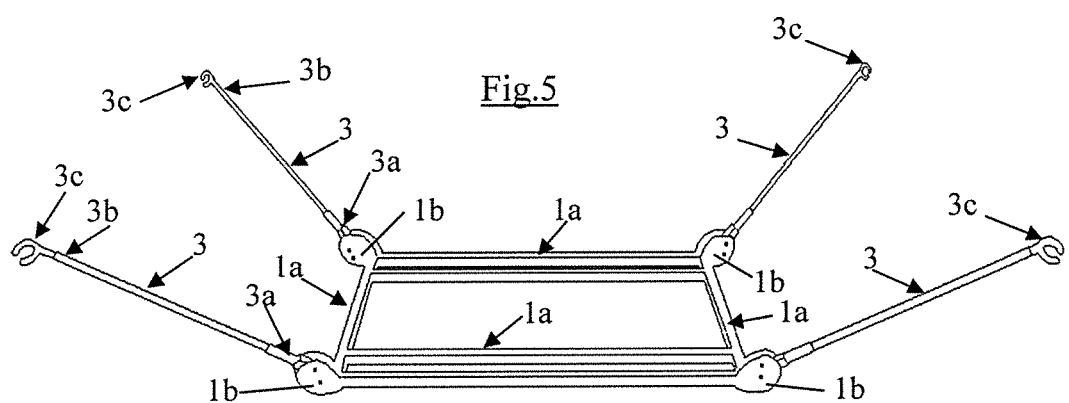

Each of the rotatable arms 3 is hinged at one of its ends 3a in a specific supporting element 1b of the stiff frame and is rotatable from a rest position, represented for example in FIG. 1 and in which its other end 3b, which is free, is close to the stiff frame, into an operating position, represented for example in FIG. 5 and in which its free end 3b is far from the stiff frame, i. e. from the structural elements 1a thereof, and vice versa. As can be seen very well in FIGS. 1 and 2, the direction of longitudinal extension of each supporting element 1b is not parallel to the longitudinal axis of the stiff frame and therefore is not parallel to the direction of travel of the motor vehicle either. Furthermore, as represented in FIGS. 1, 6a, 6b, each rotatable arm 3 is made up of two portions that are inclined with respect to each other, so that a portion, the shorter one having the hinged end 3a, is parallel to the longitudinal direction of the supporting element 1b and the other portion, the longer one having the free end 3b, is parallel to the associated structural element 1a of the stiff frame. The rotation of the rotatable arms 3 into their operating position involves a progressive reciprocal moving-away of their free ends 3b, which allows to widen the support device.

Each rotatable arm 3 is kept in its operating position by the locking means 4a,4b, which consist of a resting surface 4a and of a pin 4b. The resting surface 4a is arranged within a groove provided in the respective supporting element 1b and is visible for example in FIG. 6a, while the pin 4b is insertable into and extractable from the groove, transversely with respect to the longitudinal direction of the groove. In the operating position the rotatable arm 3 rests on the resting surface 4a and is fitted between the resting surface 4a and the pin 4b, please see FIG. 6b. Each rotatable arm 3 also has at its free end 3b a mouth 3c, which is used to connect the cloth 5, as will be explained.

Said at least one person can sit, lie down or partially lie down on the cloth 5, which 5 has connecting means 6a by which it 5 is connectable to the free ends 3b of the rotatable arms 3, so that it 5 is well-stretched following the rotation of the rotatable arms 3 into their operating position. The connecting means 6a can consist for example, as represented in FIGS. 7 and 14, of a plurality of rings 6a, so that, in order to make the connection, it is sufficient to hook a respective ring 6a to each mouth 3c of the rotatable arms 3. The cloth 5 also has end turn-ups 6b, which are used in the case in which reinforcing crosspieces 7 are provided, each of which is insertable with its two ends 7a into the respective mouths 3c of two rotatable arms 3, to connect them to each other. Within each end turn-up 6b, see FIG. 12, it is possible to insert a reinforcing crosspiece 7 before its ends 7a in their turn are inserted into the respective mouths 3c of the rotatable arms 3.

In addition to the reinforcing crosspieces 7, it is possible to provide, in order to reinforce the support device, some longitudinal reinforcing rods 8 as well, as can be seen in FIGS. 15 and 16. The two ends of each longitudinal reinforcing rod 8 are intended to be connected, in the way shown in FIG. 16, to two respective rotatable arms 3 to connect said two rotatable arms 3 to each other.

Figure 17:
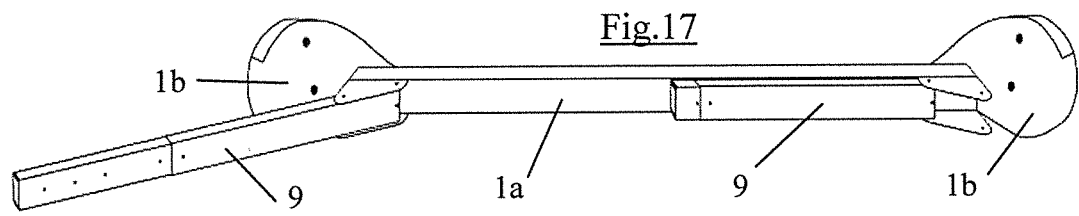
FIGS. 17 and 18 are respectively an axonometric view of a structural element of the stiff frame, to which stabilization bars are hinged, and an axonometric view similar to FIG. 7, but with the addition of the stabilization bars.
Figure 18:
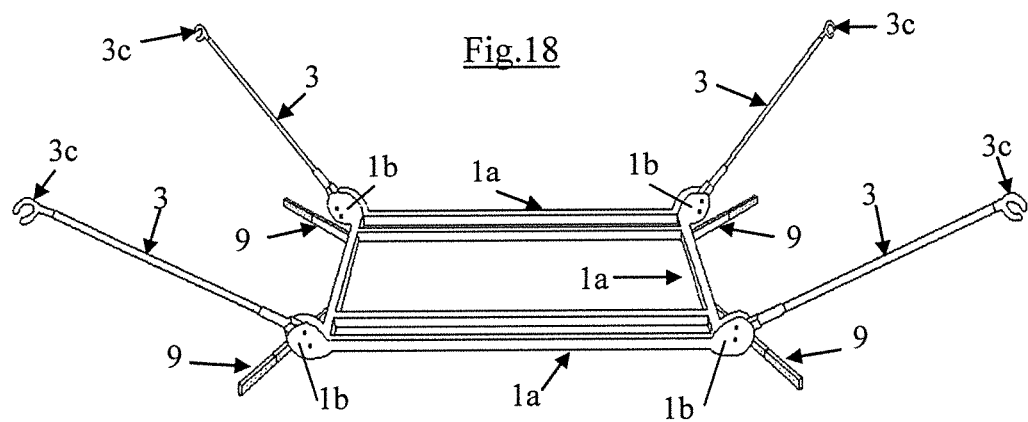
Figure 19:
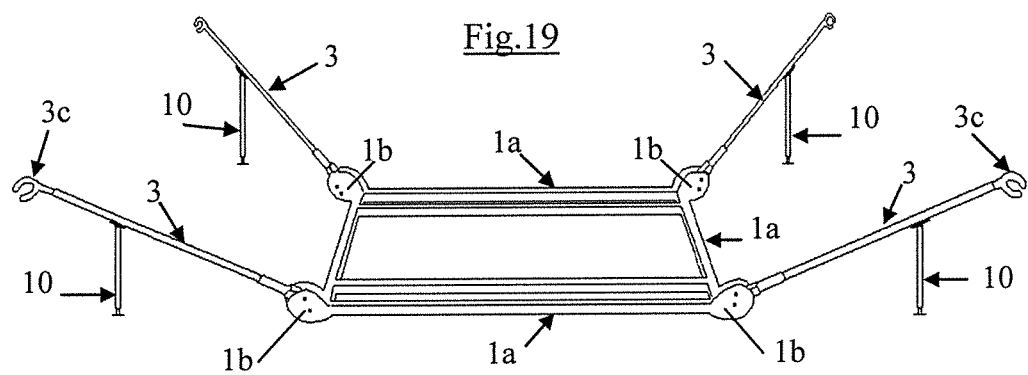
FIGS. 19 and 20 are respectively an axonometric view similar to FIG. 7, but with the addition of supporting stakes, and an enlarged axonometric view of the zone of connection between a rotatable arm and a supporting stake.

As said, the support device can also be placed on the ground. In this case it is suitable to provide a plurality of stabilization bars 9, see FIGS. 17 and 18, and/or a plurality of supporting stakes 10, see FIGS. 19 and 20.

Each of the stabilization bars 9 is adjustable in length and is hinged to a structural element 1a of the stiff frame, in such a way as to be rotatable from an inactive position, in which the stabilization bar 9 extends parallel to the associated structural element 1a of the stiff frame, into an active position, in which the free end of the stabilization bar 9 extends away from the stiff frame.

Figure 20:
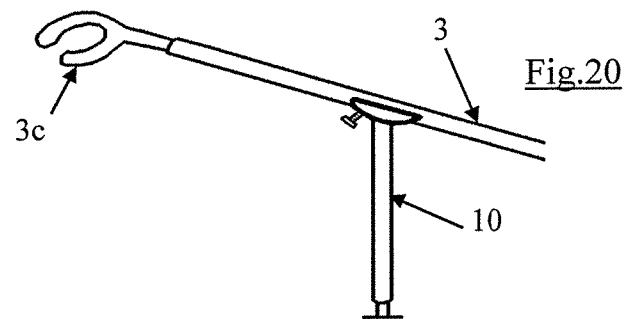

Each supporting stake 10 is fixable to an associated rotatable arm 3, for example in the way shown in FIG. 20, to take an active position, in which the free end of the supporting stake 10 extends away from the rotatable arm 3. Each supporting stake 10 is also adjustable in length.

In the case of the preferred embodiment represented in the figures the structural elements 1a of the stiff frame suitably form a resting plane having a rectangular plan and both the rotatable arms 3 and the supporting elements 1b are four. Furthermore, the supporting elements 1b are suitably located in correspondence of the vertices of the resting plane and the cloth 5 is suitably rectangular. In this case the resting plane can be used as a luggage rack.

The cloth 5 can also have anchoring seats 5a and hooking means 5b. The anchoring seats 5a are for anchoring in them 5a a load-bearing structure 11 for a covering cloth, such as a mosquito net cloth or a rain/sun protective cloth. The hooking means 5b are used for hooking the covering cloth arranged on the load-bearing structure 11. A possible suitable load-bearing structure 11 (the classic curved cross sticks) is represented in FIG. 10 and is anchored, in the way shown in FIGS. 11a and 11b, in the anchoring seats 5a provided on the cloth 5. As far as the hooking means 5b are concerned, they can be hooks present on the lower surface of the cloth 5, to which 5b the rings with which the covering cloth is provided on its edges can be hooked. In this way the covering cloth can be turned up around the cloth 5 and there is no gap between the cloth 5 and the covering cloth. As an alternative, the well-stretched cloth 5 can also act as a pitch on which an already mounted camping tent can be placed and anchored. To this purpose, it is sufficient to hook to the hooking means 5b the cords and the rings of the mounted camping tent, which are normally hooked to the pegs inserted in the ground. Therefore, the well-stretched cloth 5 can act, alternatively, both as a floor for a tent made up of the load-bearing structure 11 anchored in the anchoring seats 5a, of the cloth 5 itself and of the covering cloth arranged on the load-bearing structure 11 and hooked to the hooking means 5b, and as a pitch on which an already mounted camping tent can be placed and hooked.

Finally, the cloth 5 can have a plurality of reinforcing strips 5c, symbolically represented by hatched lines in the figures, which extend parallel to and spaced from each other along the longitudinal dimension of the cloth 5. Each reinforcing strip 5c extends between two rings 6a, to counteract the tensile forces acting on the cloth 5 and to reinforce it locally. They 5c also subdivide the surface of the cloth 5, delimiting the various zones dedicated to the people lying down.

The operation of the support device is as follows.

The support device is mounted, by using the securing means 2a,2b, in the typical position of a luggage rack, by securing it to the roof bars of the motor vehicle. On the flat resting plane having a rectangular plan of the stiff frame one can optionally load luggage. During the travel the rotatable arms 3 are in the rest position and the cloth 5 is folded among the luggage. When the vehicle stops over, the rings 6a of the cloth 5 are hooked to the respective mouths 3c of the rotatable arms 3, so that upon their following rotation from the rest position into the operating position the cloth 5 is progressively stretched. Each rotatable arm 3 is then locked in its operating position by the locking means 4a,4b. In order to activate the locking means 4a,4b, the pin 4b is first extracted, to allow the rotatable arm 3 to rest on the resting surface 4a, and then inserted again so as to prevent a rotatory movement in the opposite direction of the rotatable arm 3, i.e. towards its rest position.

The rotation of the rotatable arms 3 does not necessarily have to occur simultaneously; rather, as a rule and for the sake of convenience, one rotates and locks in the operating position one rotatable arm 3 at a time. In this way one obtains a well-stretched cloth 5, on which said at least one person can be supported.

In order to restore the initial condition, suitable for travelling, one proceeds inversely, that is to say, the pins 4b are extracted, the rotatable arms 3 are rotated into their rest position, the rings 6a are detached from the respective mouths 3c, the pins 4b are inserted again and the cloth 5 is placed among the luggage again.

Further improvements are possible, if needed. For example it is possible to enhance comfort and add the specific covering cloth (mosquito net cloth or rain/sun protective cloth) by anchoring in the anchoring seats 5a of the cloth 5 the load-bearing structure 11 for the covering cloth and then hooking the rings of the covering cloth to the hooks 5b of the cloth 5. As an alternative, one can even arrange on the cloth 5 an already mounted camping tent, by anchoring it with the cords and rings to the hooks 5b.

If one thinks that it is necessary to reinforce the support device, it is sufficient to connect two rotatable arms 3 to each other by inserting into their mouths 3c the ends 7a of a reinforcing crosspiece 7. In this case one can use a second version of the cloth 5, which has on one side an end turn-up 6b within which a reinforcing crosspiece 7 is inserted. If one wishes to further reinforce the support device, one can then connect two rotatable arms 3 to each other with a longitudinal reinforcing rod 8. However, the presence of the cloth 5 with the end turn-up 6b involves, with respect to what has been previously explained with reference to the first version of the cloth 5 with no end turn-up 6b, a small change in the sequence of the assembly operations.

In the case of the cloth 5 provided with an end turn-up 6b, in fact, it is necessary to consider the fact that, in order to be able to insert the two ends 7a of the reinforcing crosspiece 7 into the mouths 3c of two rotatable arms 3, the two rotatable arms 3 must have been previously rotated fully into their operating position, so that the two free ends 3b of the two rotatable arms 3 have moved away by a distance equal to the length of the crosspiece 7, which is rigid.

Therefore, one operates as follows. Two rotatable arms 3, arranged on the same side, are rotated into their operating position. The crosspiece 7 is inserted into the end turn-up 6b and the ends 7a of the crosspiece 7 are inserted into the mouths 3c of the two rotatable arms 3. In this way one obtains the situation shown in FIG. 12. Afterwards, the other two rotatable arms 3 are rotated into their operating position after the rings 6a of the other transverse side of the cloth 5 have been hooked to the mouths 3c of said other two rotatable arms 3, in which mouths 3c the ends 7a of the second crosspiece 7 are then fitted. In order to also join said second crosspiece 7 to the cloth 5, one fixes, by means for example of the cords, the further rings 6a to the second crosspiece 7.

Finally, if the support device has to be placed on the ground, it is possible to adapt to the features of the ground and stabilize the support device by rotating the stabilization bars 9 into their active positions or by securing the supporting stakes 10 to the rotatable arms 3.

The invention claimed is:

1. A support device for supporting at least one person thereon, comprising:
   a frame, which comprises a plurality of structural elements (1a) and a plurality of supporting elements (1b), wherein other components (3) of the support device are supported in the plurality of supporting elements (1b) and wherein each supporting element (1b) is rigidly connected to at least one structural element (1a);
   securing means (2a,2b) for securing the frame to roof bars of a motor vehicle in a selectively unlockable way and in such a way that a longitudinal axis of the frame is parallel to a direction of travel of the motor vehicle;
   a plurality of rotatable arms (3), each (3) of which is hinged at one of its ends (3a) in a specific supporting element (1b) of the frame and is rotatable from a rest position, in which its opposite free end (3b) is close to the frame, into an operating position, in which its free end (3b) is far from the frame, and vice versa;
   locking means (4a,4b), for locking the rotatable arms (3) in an operating position; and
   a cloth (5), on which the at least one person can be supported and which has connecting means (6a) by which the cloth (5) is connectable to the free ends (3b) of the rotatable arms (3),
   wherein a direction of longitudinal extension of each supporting element (1b) is not parallel to the longitudinal axis of the frame and
   wherein each rotatable arm (3) is made of two portions inclined with respect to each other.

2. The support device according to claim 1, wherein the securing means (2a,2b) consist of a plurality of U-shaped elements (2a) and of a plurality of small plates (2b), each U-shaped element (2a) enclosing a roof bar of the motor vehicle and a structural element (1a) of the frame and being closed on its open side by a small plate (2b) screwed to the U-shaped element (2a).

3. The support device according to claim 1, wherein the locking means (4a,4b) for each rotatable arm (3) consist of a resting surface (4a), which is arranged within a groove provided in the respective supporting element (1b), and of a pin (4b), which is insertable into and extractable from the groove transversely with respect to the longitudinal direction of the groove, wherein in the operating position the rotatable arm (3) rests on the resting surface (4a) and is fitted between the resting surface (4a) and the pin (4b).

4. The support device according to claim 1,
wherein each rotatable arm (3) has at its free end (3b) a mouth (3c),
wherein the connecting means (6a) of the cloth (5) consist of a plurality of rings, and
wherein a ring (6a) is hooked in each mouth (3c) of the rotatable arms (3).

5. The support device according to claim 4, further comprising reinforcing crosspieces (7), wherein the two ends (7a) of each reinforcing crosspiece (7) are insertable into the respective mouths (3c) of two rotatable arms (3) to connect the two rotatable arms (3) to each other.

6. The support device according to claim 5, wherein the cloth (5) has end turn-ups (6b), in each of which (6b) a reinforcing crosspiece (7) is insertable before the ends (7a) thereof are inserted in their turn into the respective mouths (3c) of the rotatable arms (3).

7. The support device according to claim 5, further comprising longitudinal reinforcing rods (8), wherein the two ends of each longitudinal reinforcing rod (8) are connected to two respective rotatable arms (3) to connect said two rotatable arms (3) to each other.

8. The support device according to claim 1, further comprising a plurality of stabilization bars (9), each of which is adjustable in length and is hinged to a structural element (1a) of the frame, in such a way as to be rotatable from an inactive position, in which the stabilization bar (9) extends parallel to the associated structural element (1a) of the frame, into an active position, in which the free end of the stabilization bar (9) extends away from the frame, and vice versa.

9. The support device according to claim 1, further comprising a plurality of supporting stakes (10), each of which is adjustable in length and is fixable to an associated rotatable arm (3) to take an active position in which the free end of the supporting stake (10) extends away from the rotatable arm (3).

10. The support device according to claim 1,
wherein the structural elements (1a) of the frame form a flat resting plane having a rectangular plan,
wherein the support device includes four rotatable arms (3) and four supporting elements (1b),
wherein the supporting elements (1b) are located in correspondence of the vertices of the resting plane and wherein the cloth (5) is rectangular.

11. The support device according to claim 1, wherein the cloth (5) has anchoring seats (5a) for anchoring a load-bearing structure (11) for a covering cloth therein (5a), and hooking means (5b) to which the covering cloth or a camping tent can be hooked.

12. The support device according to 4, wherein the cloth (5) has a plurality of reinforcing strips (5c), which extend parallel to and spaced from each other along the longitudinal dimension of the cloth (5), and wherein each reinforcing strip (5c) extends between two rings (6a).

* * * * *